Sept. 14, 1954   U. E. WILD, JR   2,689,292
ELECTRIC SWITCH
Filed July 31, 1953
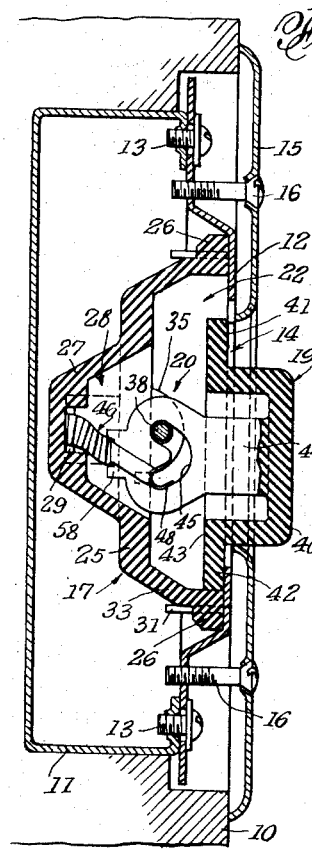
Inventor
URBAN E. WILD, JR.
C. G. Stratton
Attorney Patented Sept. 14, 1954

2,689,292

UNITED STATES PATENT OFFICE 2,689,292

ELECTRIC SWITCH

Urban E. Wild, Jr., Los Angeles, Calif.

Application July 31, 1953, Serial No. 371,458

7 Claims. (Cl. 200—154)

This invention relates to an electric switch of the wall-mounted type.

An object of the present invention is to provide an electric switch that is characterized by its simplicity of construction in that the same is comprised of relatively few parts as compared to existing switches for the same purpose.

Another object of the invention is to provide an electric switch that is simple and inexpensive to manufacture because of its simplicity of construction.

A further object of the invention is to provide an electric switch embodying a novel snap action between on and off positions, the same being predicated on a unitary spring element that combines both over-center spring action and electrical conduction.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes, one embodiment of the present invention, which is given by way of illustration or example only.

In the drawings, like reference characters designate similar parts in the several views.

Fig. 1 is a longitudinal sectional view of an electric switch embodying features of the invention, the same being shown in "off" position.

Fig. 2 is a front elevational view thereof with parts removed and broken away for clearer illustration.

Fig. 3 is a cross-sectional view of the switch as in Figs. 1 and 2.

Fig. 4 is a view similar to Fig. 1 showing the same in "on" position, the mounting parts of said switch being omitted.

Fig. 5 is an enlarged sectional view showing the switch in an intermediate position during transition between "on" and "off" positions.

Fig. 6 is similarly enlarged fragmentary sectional view showing a detail of construction.

The present switch may be mounted, in the usual manner, on a wall 10 and be disposed within an outlet box 11 of generally conventional form and mounted in a suitable cavity in said wall. A bracket plate 12 is removably mounted, as by screws 13, across the open front of box 11, the same carrying the present switch 14. A suitable switch or escutcheon plate 15 is removably secured to bracket plate 12, as by screws 16, the same closing the wall cavity within which outlet box 11 is disposed.

The present switch 14 comprises, generally, a case or body 17 carried by bracket plate 12, a contact bar 18 mounted in said body and serving as one terminal of the switch, a switch-operating button 19 operatively mounted in said body, and means 20 interconnecting said body and button, including the other terminal 21 of the switch, controlling electrical connection and separation of the terminals and snap action of the button during movement thereof.

Body 17 may be made of any suitable dielectric material, of which a plastic, such as bakelite, is an example. Said body is formed to have a forwardly facing cavity 22 that is defined by peripheral side walls 23 and end walls 24, and a bottom or rear wall 25. The end walls 24 are provided with centrally disposed integral lugs 26.

A rearward projection 27 extends from rear wall 25 and the same is provided with a relatively narrow recess 28 that opens on cavity 22 and terminates in a laterally open slot 29 in wall 30 that defines the bottom or rear of recess 28.

The open front of body 17 is disposed against bracket plate 12 which is provided with sheared and rearwardly bent lugs 31 that are spaced to straddle body lugs 26 and engage the outer faces of end walls 24. The outer faces of the body walls 23 are engaged by rearwardly bent flanges 32 on the side edges of said bracket plate. By providing for a tight-fit engagement of lugs 31 and flanges 32 with the body, the latter is firmly held in place by said bracket plate. In any case, the ends of lugs 31 may be bent inwardly to engage sloping walls 33 of the body to insure such firm position of the body. Said bracket has an opening 34 that frames cavity 22 of said body, the same being of a size to freely pass button 19 and accommodate the movement thereof.

Extending forwardly from the middle of the front face of body wall 25 and within said cavity 22, there is provided a half-round projection 35 that is divided into two parts, as seen in Fig. 3, to reside on both sides of recess 28.

The contact bar 18 is made in the form of a screw 36 having a head 37 and transversely extending through body 17 and through the projections 35 thereof. Between said projections, the threads of said screw are removed to leave a round bar portion 38 which, therefore, extends across the front of recess 28. The body is tapped for the threads of said screw and the head 37 of the latter serves to connect a conductor 39 to contact bar 18. A suitable washer may be interposed between head 37 and the switch body, if desired.

The operating button 19 is also dielectric and may be made of a material the same or comparable to that of body 17. Said button comprises a manually-engageable head 40 that is fitted in frame opening 34 of bracket plate 12, and end flange portions 41 and 42 that bear the respective indicia "Off" and "On." The length of said button between the ends of said flanges is less than the length of cavity 22 between end walls 24, the difference constituting the movement of the button from one position to the other. Said button has an inner or rearward face 43 that is adapted to engage projection 35. The outward or forward position of said button is limited by bracket plate 12.

The means 20 comprises an integral rearwardly extending projection 44 on button 19, said projection extending into recess 28, a cam slot 45 formed in said projection and through which contact bar 18 passes, a combined contact and over-center spring 46 having one end 47 disposed in slot 29 and having a socket 48 formed in the other end and engaged in cam slot 45, a terminal contact 49 of angle form having one leg thereof also disposed in slot 29 and in electrical contact with end 47 of spring 46 and having its other leg in flat engagement with a side of housing projection 27 and secured thereto by a binding screw 50. A conductor 51, by clamping under the head of said screw, is electrically connected to said terminal contact 49.

Between its ends, said contact spring 46 is provided with a series of reverse bends 52 by means of which said spring is contracted and expanded, and with an angularly directed portion 53 that connects the portion having the reverse bends and socket 48. The latter, therefore, is normally offset from spring end 47.

Said socket 48 is of U-shaped form to fit one end 54 of cam slot 45, said slot having a similar opposite end 55. Between its ends, the slot has a blunted V-form with said ends directed rearward. Portion 53 of spring 46 resides against one face of projection 44 and a tongue 56 bent from socket 48 resides against the opposite face, as best seen in Fig. 6. The rearward end of projection 44 is formed with a seat 57 in which the upper end of the portion having the reverse bends is seated. Projection 44 is formed symmetrically on button 19 so that the cam slot ends 54 and 55 ar equally spaced on both sides of the middle of said projection.

Reference is now made particularly to Figs. 1 and 2, wherein it will be seen that button 19 is offset downward in cavity 22 with contact bar 18 in the end 55 of the cam slot 45. Since said bar and the end 47 are aligned on the middle of the body 17 between end walls 24, the seat 57 holds the outer end of the portion of spring 46 that has the reverse bends 52 substantially offset from spring end 47, said portion being substantially aligned with angularly directed portion 53 of spring 46. At the same time, the bend-containing portion is under compression and, seeking to expand, presses the button outward against bracket plate 12.

It will be noted that the portion 58 of projection 44, which has seat 57 formed therein, is wider than the reduced portion 59 of recess 28 and in which the bottom of spring 46 resides.

From the above condition, by pushing the button 19 with the thumb, forefinger, or the heel of the hand, said button is depressed against the force of spring 46 and moves angularly rearward and upward as guided by the angular leg of cam slot 45 which extends from end 55. As the button approaches a centered position, by reason of its angular motion, the corner 60 of projection portion 58 encounters wall 30 at the time that the cam slot 45 substantially centers on contact bar 38 and button face 43 encounters rounded projection 35. Since the corner of portion 58 opposite to the corner 60 is unsupported, the button 19 can rock around projection 35 only to the position 19a with corner 60 as a fulcrum, thereby bringing contact bar 38 into the leg of the cam slot 45 in which socket 48 resides.

The switch structure thus provided is silent in operation although the same has an over-center snap action. The indicated use as a wall switch is by way of example, since the switch may be used in other ways.

Release of the button allows the contracted spring 46 to expand and bring spring socket 48 into firm electrical engagement with said contact bar. This position is shown in Fig. 4 and is the "On" position of the switch, wherein conductors 39 and 51 are electrically connected through contacts 18 and 46. The button 19 is moved to "Off" position in the same manner as described above, except that the button tilts to the angular position 19b when rocking on projections 35 and the fulcrum on the opposite side to fulcrum 60.

While I have illustrated and described what I now contemplate to be the best mode of carrying out my invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described the invention, what I claim and desire to be secured by Letters Patent is:

1. An electric switch comprising a dielectric body having a forwardly open cavity, a contact bar extending across said cavity, a rounded projection disposed within the cavity, a dielectric operating button disposed within the cavity and of lesser over-all length than the length of the cavity, said button having a rearwardly directed face adapted to engage said rounded projection and, when so engaged, the button is adapted to rock on said projection, a rearward projection on the button, a V-shaped cam slot in the latter projection and having ends rearward of the apex of the slot and symmetrically on opposite sides of the middle of the button, said contact bar extending through the cam slot, and a contractale and extensible spring having one end anchored in the body and its opposite end comprising a socket disposed in one said slot end, said spring being biased to project the button forwardly and being flexible relative to its anchor to flex during movement of the button from one end of the cavity in the body to the other end and bring the contact bar into engagement with one cam slot end or the other according to the direction of movement of said button, said contact bar and spring, when the former is engaged in the socket of the latter, closing the circuit through said switch.

2. An electric switch according to claim 1: said button comprising a manually-engageable and forwardly projecting middle portion and oppositely directed upper and lower flange portions, and means connected to the body and engaging said flange portions to limit the forward position of the button.

3. An electric switch according to claim 1: the contractable and extensible spring being provided with a series of reverse bends which normally expand and which contract under manual rearward pressure on the button.

4. An electric switch according to claim 1: the contractable and extensible spring being provided with a series of reverse bends which normally expand and which contract under manual rearward pressure on the button, the rearward projection of the button having a seat in its rearward end in which the end of the spring having the reverse bends is engaged.

5. In an electric switch comprising a dielectric body having a cavity in which a manually-operable button is movable, there being a contact bar extending across the cavity, and said button having an extension provided with a cam slot through which said bar extends, a resilient contact having one end anchored to the body and provided at the other end with a socket fitted into an end of said cam slot and adapted to electrically engage said bar when the button is moved in one direction.

6. In a switch according to claim 5: said resilient contact, adjacent its anchored end, being provided with a series of reverse bends that are normally expanded and are adapted to contract when said button is pushed into the cavity.

7. In a switch according to claim 5: said resilient contact, adjacent its anchored end, being provided with a series of reverse bends that are normally expanded and are adapted to contract when said button is pushed into the cavity, said extension of the button having a seat in which the end of the portion having the reverse bends is engaged so that said spring will flex relative to its anchor when the button is moved.

References Cited in the file of this patent

UNITED STATES PATENTS

| Number | Name | Date |
|---|---|---|
| 2,130,589 | Lantz | Sept. 20, 1938 |
| 2,209,918 | Hammerly | July 30, 1940 |
| 2,352,936 | Bryant | July 4, 1944 |